United States Patent
Hayakawa et al.

(10) Patent No.: US 6,935,978 B2
(45) Date of Patent: Aug. 30, 2005

(54) CHAIN TENSIONER

(75) Inventors: Hisashi Hayakawa, Shizuoka-ken (JP); Seiji Sato, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/685,703

(22) Filed: Oct. 16, 2003

(65) Prior Publication Data

US 2004/0138018 A1 Jul. 15, 2004

(30) Foreign Application Priority Data

Oct. 17, 2002 (JP) ........................................ 2002-303031

(51) Int. Cl.[7] ................................................. F16H 7/22
(52) U.S. Cl. ......................... 474/109; 474/110; 474/117
(58) Field of Search ......................... 474/109–111, 117, 474/101

(56) References Cited

U.S. PATENT DOCUMENTS 5,700,214 A * 12/1997 Kuznets et al. ............. 474/110
5,931,754 A * 8/1999 Stief et al. .................. 474/109
5,967,920 A * 10/1999 Dembosky et al. .......... 474/109

FOREIGN PATENT DOCUMENTS

JP 02001355691 A * 12/2001

* cited by examiner

*Primary Examiner*—Emmanuel M Marcelo
(74) *Attorney, Agent, or Firm*—Arent Fox, PLLC (57) ABSTRACT

A chain tensioner is provided, in which the design conditions of a register ring are optimized in compliance with the required functions so as to improve the durability, the operational stability and the like of the chain tensioner. A register ring is formed of a steel material having a tensile strength of 1000 to 3500 N/mm². At the same time, an overlapping allowance of the register ring with respect to engagement grooves of a plunger is set within the range of 30 to 50% of a wire diameter of the register ring. Furthermore, a bending stress generated in the register ring when the register ring is made to slide between the engagement grooves to increase its diameter is set within the range of 500 to 1700 N/mm².

4 Claims, 6 Drawing Sheets

|  | Before Application Of Load | After Application Of Load |
|---|---|---|
| Sample 1 | φ13.032 | φ13.026 |
| Sample 2 | φ13.034 | φ13.039 |
| Sample 3 | φ13.037 | φ13.050 |

Fig. 11

CHAIN TENSIONER

BACKGROUND OF THE INVENTION

1. Field of the Invention

The present invention relates to a chain tensioner for keeping the tension of a chain constant, which is placed on a loose side of the chain, in a chain transmission system for transmitting the rotation of a crank shaft to a cam shaft, for example, in a vehicle engine.

2. Description of the Related Art

As the above-described chain tensioner, a chain tensioner having the following structure is conventionally known. A spring and a plunger are housed within a housing so that outward projection ability is imparted to the plunger by an elastic force of the spring. In this chain tensioner, the plunger, which is elastically pressed by the spring, pushes the chain so as to bring the chain into a tensed state. On the other hand, the pushing force imparted to the plunger by the chain is buffered by an oil pressure in an oil hydraulic damper chamber formed in the rear of the plunger to keep a tensile force of the chain constant. As specific structures, for example, those described in, for example, Japanese Patent Laid-Open Publication Nos. 2001-146946 and 2001-355691 are known.

In this type of chain tensioner, a register ring is provided as a member for regulating the backward movement of the plunger (return regulation). The register ring is engaged with a first stopper formed on the inner circumferential surface of the housing while being fitted into any of a plurality of engagement grooves formed on the outer circumferential surface of the plunger. As described above, the register ring plays an important role in regulation of the backward movement of the plunger so as to prevent the chain from being excessively loosened and the like.

As described above, the register ring is an important component in view of realization of the functions of the chain tensioner. Therefore, the design conditions of the register ring such as a shape and a material should be deliberately determined in consideration of the functions of the chain tensioner.

SUMMARY OF THE INVENTION

In view of the above-described requirements, the present invention has an object of optimizing the design conditions of a register ring in compliance with the required functions so as to improve the durability, the operational stability, and the like of a chain tensioner.

In order to achieve the above object, a chain tensioner according to the present invention includes: a cylindrical housing with a closed end; a plunger slidably fitted into the housing on its inner circumference; a return spring for imparting outward projection ability to the plunger; a plurality of engagement grooves formed on an outer circumference of the plunger; a first stopper formed on the inner circumference of the housing; and a register ring capable of elastically increasing and reducing its diameter, being engaged with the engagement grooves, any of the engagement grooves being engaged with the first stopper through the register ring to regulate backward movement of the plunger, wherein the register ring is formed of a steel material having a tensile strength of 1000 to 3500 N/mm$^2$.

If the register ring is formed of a steel wire having a tensile strength of 1000 to 3500 N/mm$^2$ as described above, the durability of the register ring can be enhanced.

An overlapping allowance of the register ring with respect to the engagement grooves of the plunger is set within the range of 30 to 50% of a wire diameter of the register ring. At the same time, the maximum bending stress of the register ring having an increased diameter, when it is positioned between the engagement grooves, is set within the range of 500 to 1700 N/mm$^2$. As a result, it is ensured that the backward movement of the plunger can be regulated at engine stop and the like.

Moreover, the plunger can be made to follow the movement of a chain so as to smoothly project even during engine operation.

In this case, if the register ring is formed of an oil-tempered wire, the heat resistance of the register ring can be ensured.

BRIEF DESCRIPTION OF THE DRAWINGS

In the accompanying drawings:

FIG. 1(*a*) is a plan view showing a chain tensioner according to the present invention, and FIG. 1(*b*) is a side view thereof;

FIG. 4(*a*) is a plan view of a register ring, FIG. 4(*b*) is a front view thereof, and FIG. 4(*c*) is a side view thereof;

DETAILED DESCRIPTION OF THE PREFERRED EMBODIMENTS

Hereinafter, embodiments of the present invention will be described with reference to FIGS. 1(*a*) to 11.

Figure 1A:
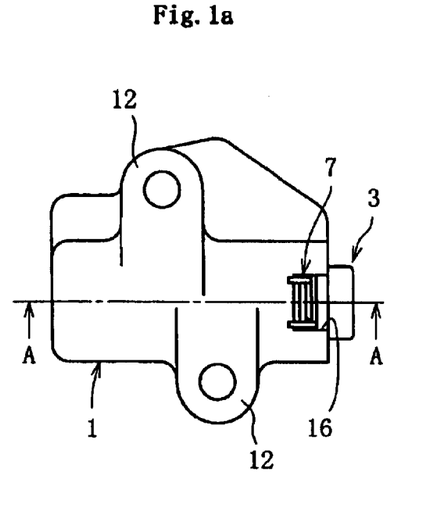
Figure 1B:
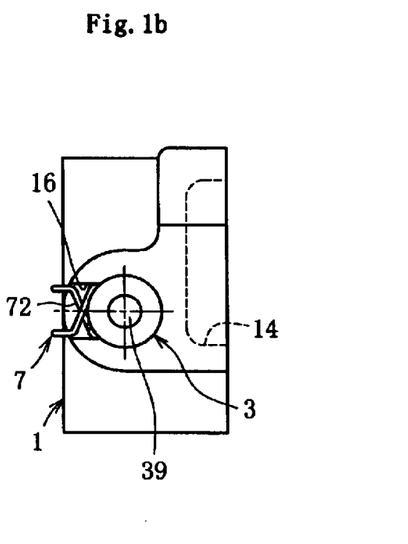

As shown in FIGS. 1(*a*), 1(*b*) and 2, a chain tensioner according to the present invention is assembled with the following components serving as main components. The chain tensioner includes: a housing 1; a plunger 3, a return spring 5 and a check valve 6 accommodated in the housing 1 on its inner circumference; and a register ring 7 fitted to the plunger 3 on its outer circumference. In the following description, a direction in which the plunger 3 projects with respect to the housing 1 is denoted as a forward direction (the right side in FIGS. 1(*a*), 2, 3 and 6 to 8), whereas the opposite direction is denoted as a backward direction (the left side in FIGS. 1(*a*), 2, 3 and 6 to 8).

The housing 1 has a cylindrical shape with a closed end, including a circular hole shaped cylinder portion 11 for housing the plunger 3 therein. Attachment portions 12 for attachment to an engine block are formed on both sides of the housing 1 sandwiching the cylinder portion 11 (see FIG. 1(*a*)). On a bottom 13 of the housing 1, an oil feeding path 15 for guiding a working oil serving as a working fluid from a tank 14 to the cylinder portion 11 is formed. The housing 1 can be formed by, for example, turning a cast made of cast iron (FC250 (according to JIS) or the like) or a light alloy (aluminum alloy or the like) or the like.

Figure 2:
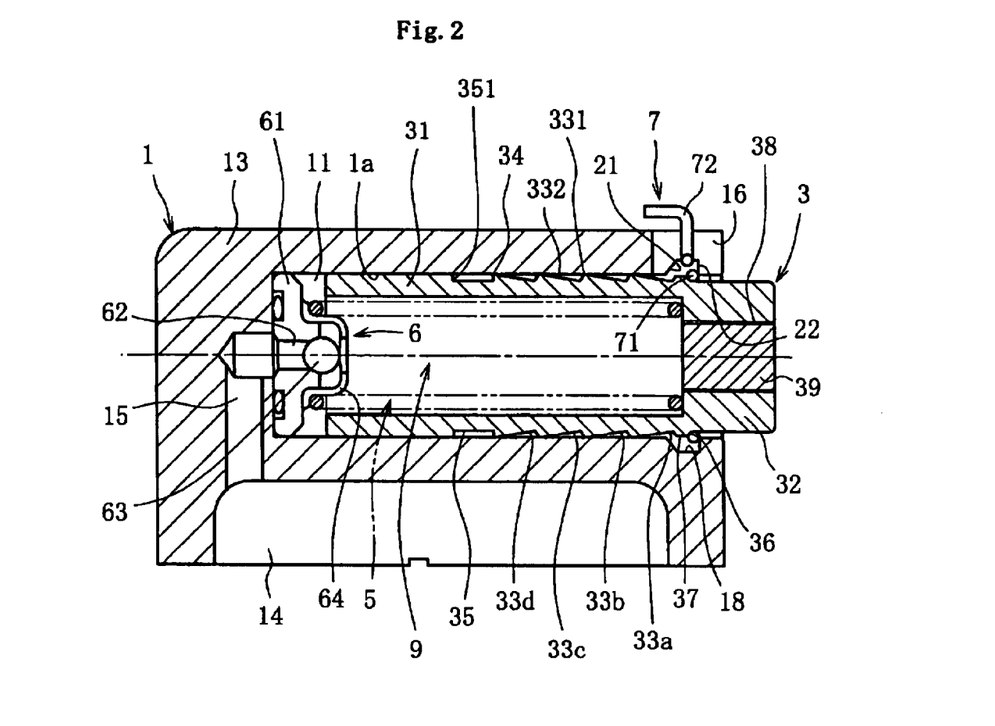
FIG. 2 is a sectional view taken along the line A—A in FIG. 1(*a*)

At an open end of an inner circumferential surface 1a of the housing, a notch 16 is formed in an axial direction at a position in a circumferential direction. Through the notch 16, operational portions 72 of the register ring 7 described below project toward the outer circumferential side of the housing 1. An annular guide groove 18 passing through the approximately middle portion of the notch 16 in the axial direction is formed in the vicinity of the open end of the inner circumferential surface 1a of the housing 1. A first stopper 21 and a second stopper 22, each being engaged with the register ring 7, are formed on both end faces of the opening of the guide groove 18 in the axial direction. The first stopper 21 and the second stopper 22 can be integrally formed with the housing 1 as shown in FIG. 2. Alternatively, they can be formed as independent members fitted into the housing 1 on its inner circumference. In this embodiment, as an example, the first stopper 21 on the rear side is formed on a tapered face, whereas the second stopper 22 on the front side is formed on a face in a radial direction. However, the shapes of the first and second stoppers are not particularly limited as long as it is ensured that the first and second stoppers are engageable with the register ring 7.

A width of the guide groove 18 in the axial direction is larger than a wire diameter of a ring portion 71 of the register ring 7. Therefore, the ring portion 71 of the register ring 7 is movable in the guide groove 18 in forward and backward directions.

The plunger 3 is formed in a cylindrical shape with a closed end so as to have a cylindrical hollow portion 31 on its rear side. A return spring 5 in a compressed state is placed inside the inner circumference of the hollow portion 31. One end of the return spring 5 is supported by the bottom of the inner circumferential surface of the plunger 3, whereas the other end of the return spring 5 is supported by an upper end face of the check valve 6 provided on the bottom of the housing 1. As a result, an elastic force in a forward direction always acts on the plunger 3 so that the projection ability in the outward direction from the housing 1 is imparted to the plunger 3. A space between the bottom 13 of the housing 1 and the plunger 3 (including the internal space of the hollow portion 31), in other words, the cylinder portion 11 situated in the rear of the plunger 3 and the internal space of the hollow portion 31 form an oil hydraulic damper chamber 9. The oil hydraulic damper chamber 9 is filled with the working oil fed through the oil feeding path 15.

On the outer circumferential surface of the hollow portion 31 of the plunger 3, a plurality of annular engagement grooves 33a to 33d are formed at equal intervals in the axial direction. In this embodiment, as an example, the four engagement grooves 33a to 33d are provided. In the following description, these engagement grooves are denoted as the first engagement groove 33a to the fourth engagement groove 33d from the front side.

Figure 3:
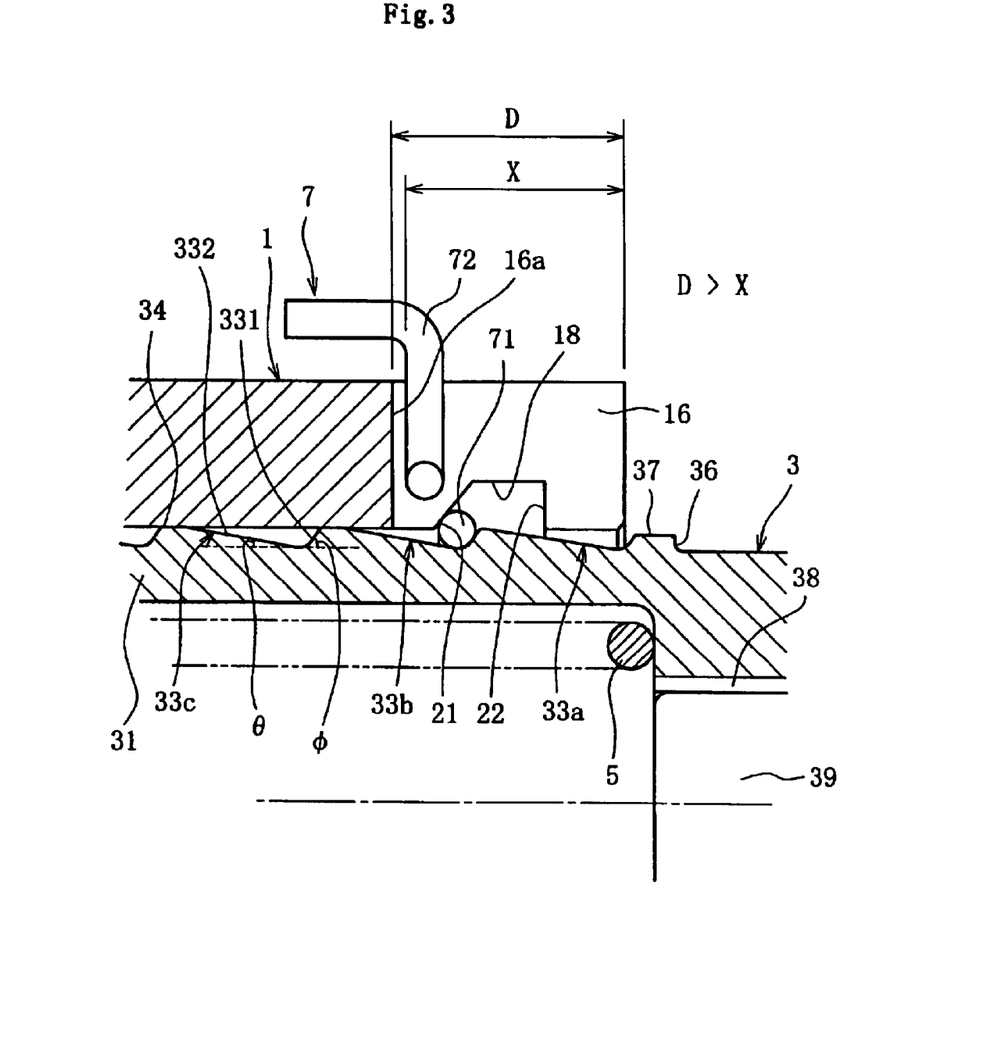
FIG. 3 is an enlarged plan view of the chain tensioner.

As shown in an enlarged manner in FIG. 3, for each of the engagement grooves 33a to 33d, wall surfaces 331 and 332 on both sides in the axial direction, between which the deepest portion is placed, are both formed in a tapered manner. However, the wall surface 331 (lock surface) on the front side has a larger tilt angle than that of the wall face 332 (tapered surface) on the rear side. The lock surface 331 and the tapered surface 332 are smoothly continued through a curved surface.

The tapered surface 332 of each of the engagement grooves 33a to 33d serves as a sliding surface on which the register ring 7 slides. A taper angle θ of the tapered surface 332(angle with respect to the center of the axis of the plunger 3: see FIG. 3) is too large, a sliding resistance is increased by sliding movement of the register ring 7 to inhibit the smooth forward and backward movement (in particular, the forward movement) of the plunger 3. On the other hand, if the taper angle θ is too small, the lengths of the engagement grooves 33a to 33d in the axial direction become long. As a result, a return stroke of the plunger 3 at engine stop becomes large to cause abnormal sounds at engine restart. In view of the above inconveniences, the taper angle of the tapered surface 332 is set within the range of 8° to 20°, preferably, within the range of 10° to 15°. Similarly, in order to reduce a sliding resistance of the plunger 3 and to obtain a stable sliding surface with a small variation in friction coefficient, the engagement grooves 33a to 33d (in particular, their tapered surfaces 332) are finished to have a surface roughness $R_{max}$ (JISB0601) of 6.3 μm or less, more preferably, 3.2 μm or less.

In the rear of each of the engagement grooves 33a to 33d, a cylindrical surface 34 is formed so as to be adjacent to each tapered surface 332.

As shown in FIG. 2, among the engagement grooves 33a to 33d, in the rear of the fourth engagement groove 33d positioned in the last row, an annular safety groove 35 is formed. A wall surface of the safety groove 35 on the rear side serves as a safety wall 351 engageable with the register ring 7. The register ring 7 being engaged with the safety wall 351 is subsequently engaged with the second stopper 22 on the inner circumferential surface 1a of the housing 1, thereby restraining the plunger 3 from being pushed out from the cylinder portion 11 (disassembly regulation).

An annular set wall 36 is formed in front of the first engagement groove 33a positioned in the first row among the engagement grooves 33a to 33d. The set wall 36 can be formed, for example, as shown in FIG. 3, with a front surface of an annular projecting portion 37 in a radial direction, the annular projecting portion 37 being formed in front of the first engagement groove 33a. The register ring 7 being engaged with the set wall 36 is engaged with the second stopper 22 of the inner circumferential surface 1a of the housing 1, thereby maintaining the chain tensioner in its initial set state (state shown in FIG. 2).

The plunger 3 can be formed by forging a steel material such as carbon steel for machine construction, chromium steel, chromium-molybdenum steel and manganese steel for machine construction (preferably, containing carbon at 0.25% or less in view of the processability, the hardenability, the cost and the like). After forging, each of the engagement grooves 33a to 33d on the outer circumferential surface of the plunger 3 is formed by plastic processing (for example, component rolling) or mechanical processing to have the above-described surface roughness (it is apparent that the other grooves such as the safety groove 35 can be processed by a similar processing method). After the plunger material, on which the grooves have been formed, is subjected to a thermal treatment such as carburizing and quenching, the outer circumferential surface of the hollow portion 31 of the plunger 3 and the cylindrical surface 34 are finished by centerless grinding. As a result, a fitting surface onto the inner circumferential surface 1a of the housing 1, which affects the amount of leak of the working oil or a sliding resistance of the plunger 3, is finished with predetermined precision.

If air enters the oil hydraulic damper chamber 9, the buffering functions in the oil hydraulic damper chamber 9 are adversely affected. Therefore, the entrained air is required to be exhausted to the exterior of the oil hydraulic damper chamber 9 by some method. From this point of view, an air vent hole 38 is formed in a bottom 32 of the plunger 3 in the illustrated example. The air vent hole 38 in the illustrated example is formed in a spiral manner by forming a female screw hole in the bottom 32 in the axial direction and pushing an axial member 39 into the screw hole. The air vent hole can alternatively be formed on the housing 1 side, depending on the angle at which the chain tensioner is attached.

The check valve 6 is provided adjacent to the bottom 13 of the housing 1. The check valve 6 is constituted by, for example, a valve seat 61, a valve body 63 (for example, a steel ball) for opening and closing a valve hole 62 formed through the valve seat 61, and a retainer 64 for limiting the amount of opening/closing of the valve body 63. When the oil feeding path 15 has a higher pressure than that of the oil hydraulic damper chamber 9, the check valve 6 opens the valve hole 62 so that the working oil flows from the oil feeding path 15 into the oil hydraulic damper chamber 9. On the other hand, when the oil hydraulic damper chamber 9 has a higher pressure than that of the oil feeding path 15, the check valve 6 closes the valve hole 62 so that the working oil in the oil hydraulic damper chamber 9 is prevented from reversely flowing into the oil feeding path 15.

Figure 4A:
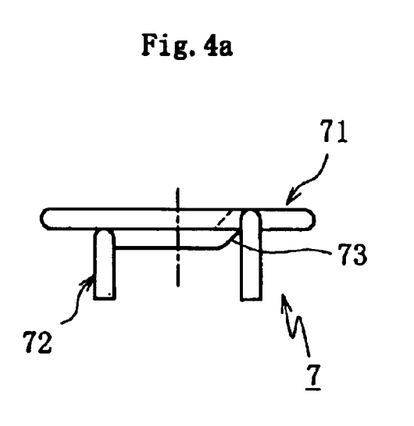
Figure 4B:
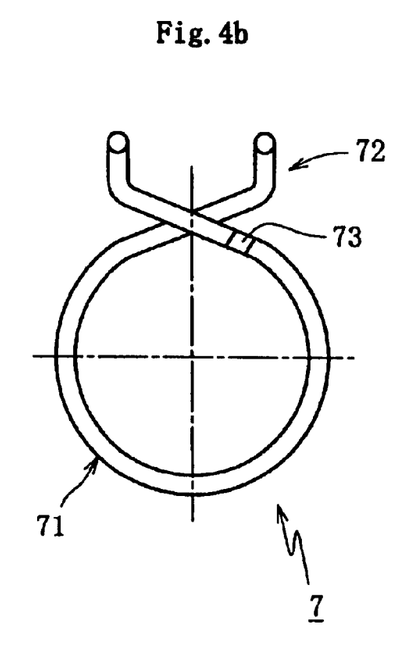
Figure 4C:
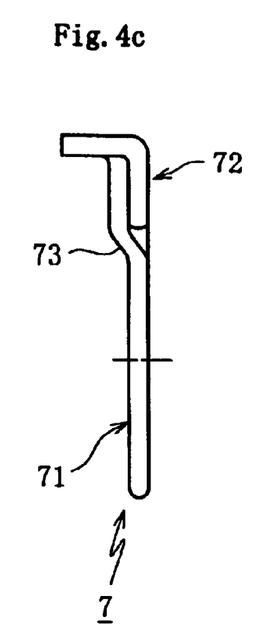

The register ring 7 includes, as shown in FIGS. 4(a) to 4(c), an annular ring portion 71, and the operational portions 72 for increasing the diameter of the ring portion 71. The register ring 7 is formed by, for example, crossing both ends of a rolled wire material. The operational portions 72, which are situated on the outer diameter side of the crossing portion, are brought close to each other in the circumferential direction, thereby elastically increasing the diameter of the ring portion 71. In this case, both ends of the operational portions 72 are bent in the axial direction to form tab portions. These tab portions facilitate the operation of increasing the diameter of the ring portion 71. A step portion 73 in the axial direction is provided for the ring portion 71 in the vicinity of the crossing portion of the wire material. In this manner, the most part of the ring portion 71 is situated on a plane perpendicularly crossing the axial direction. The above-described register ring 7 corresponds to a so-called formed wire spring, that is, a wire material bent in an appropriate shape to perform a spring action. This type of spring has similar shape and functions as those of the hose clip according to the Japanese Automobile Standards JASO F204.

A material of the register ring 7 is appropriately selected for use from the group consisting of spring steel, a piano wire, a hard steel wire, an oil-tempered wire, a stainless steel wire and the like. A material is selected in consideration of a limit of elasticity, an elastic modulus, a fatigue strength, a hardenability, a heat resistance, a corrosion resistance, a thermal expansion and the like. In this embodiment, an oil-tempered wire, in particular, a silicon-chromium steel oil-tempered wire for valve spring, SWOSC-V, according to JIS G3566 (in this embodiment, one with a circular cross section and a wire diameter of 0.8 mm) is used so as to be compatible with an increase in temperature of the operating environment (at 120° C. or higher). The oil-tempered wire is cold-worked to form the register ring 7 in this embodiment. The oil-tempered wire is formed in the following manner. After a wire material such as carbon steel or low-alloy steel is cold-worked and is drawn into a wire so as to obtain good dimensional accuracy and surface conditions, the material in a wire form is quenched and tempered in a successive manner so as to be provided with appropriate mechanical properties. A spring formed by using this wire has approximately similar structure and characteristics to those of a hot formed spring. This spring has a higher ratio of the limit of elasticity and the yield strength to the tensile strength as compared with steel wires formed by cold working and drawing, and is therefore advantageous in that a high heat resistance can be expected. If the heat resistance is not considered as a quite important factor, a piano wire such as SWP-A, SWP-B or SWP-V according to JIS, which is advantageous in terms of cost and processability, can also be used. A wire diameter P of the register ring 7 (see FIG. 11) is desirably within the range of 0.8 to 1.2 mm.

Figure 5:
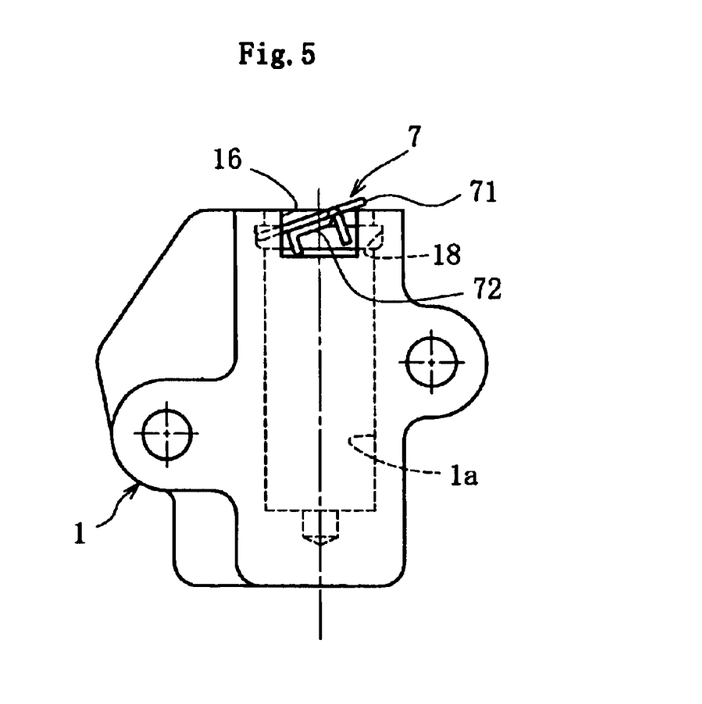
FIG. 5 is a plan view of a housing in the step of inserting the register ring.

The register ring 7 is formed so that, in its natural state (in a state where the diameter of the register ring 7 is not increased), an inner diameter of the ring portion 71 is smaller than an inner diameter of the open end of the inner circumferential surface 1a of the housing 1 (in the illustrated example, the inner diameter of the second stopper 22) and an outer diameter of the ring portion 71 is larger than the inner diameter of the open end. Since the notch 16 is formed for the housing 1, the register ring 7 can be easily attached to the housing 1 by inclining the register ring 7 even if the register ring 7 has a larger outer diameter than the inner diameter of the housing 1 on its inner circumference as described above (see FIG. 5).

After the check valve 6 is attached to the cylinder portion 11, the register ring 7 is attached and the return spring 5 is inserted. Then, the plunger 3 is inserted into the cylinder portion 11 while the operational portions 72 projecting outside the housing 1 are being picked (either manually or by a tool) to increase the diameter of the ring portion 71. The plunger 3 is pushed into the cylinder portion 11 against the elastic force of the return spring 5. When the set wall 36 reaches the position in the rear of the ring portion 71 of the register ring 7, the operational portions 72 are released to elastically reduce the diameter of the ring portion 71 of the register ring 7. At the same time, the pushing force applied on the plunger 3 is cancelled so that the set wall 36 is engaged with the ring portion 71 of the register ring 7. Furthermore, the ring portion 71 is engaged with the second stopper 22 on the inner circumference of the housing 1 so as to realize the initial set state shown in FIG. 2. In this initial set state, the set wall 36, the register ring 7, and the second stopper 22 are mutually engaged so that it is ensured that the plunger 3 is restrained from being pushed out by the elastic force of the return spring 5. Therefore, the safety in transport and the like is improved.

After attachment of the chain tensioner in this initial set state to the engine block, the operational portions 72 of the register ring 7 are pushed together to increase the diameter of the ring portion 71 of the register ring 7, thereby canceling the engaged state between the set wall 36 and the register ring 7. As a result, the plunger 3 moves forward owing to the elastic force of the return spring 5 to push the chain through a chain guide (not shown). In this manner, the chain is brought into a tensed state.

Figure 6:
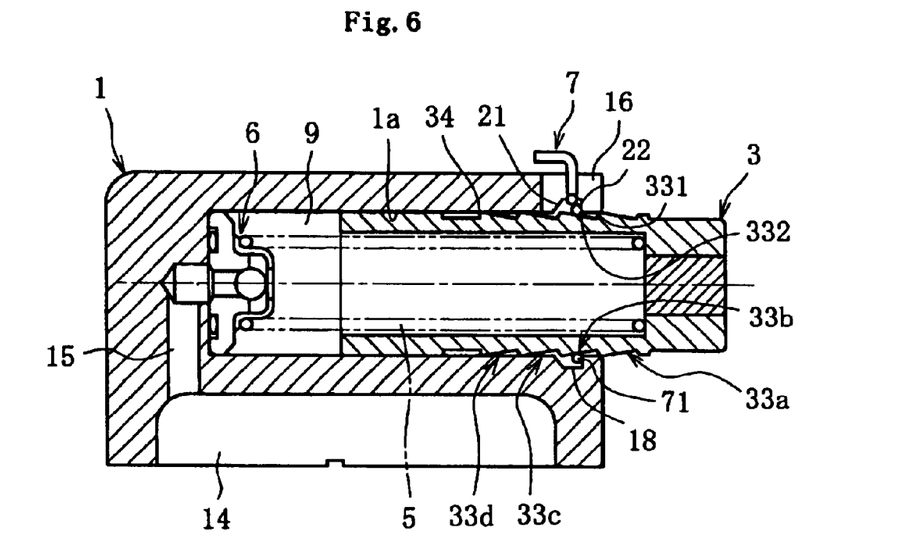
FIG. 6 is a sectional view showing an operating state of the chain tensioner.

At this moment, as shown in FIG. 6, the ring portion 71 of the register ring 7 is fitted into any of the engagement grooves 33a to 33d (in FIG. 6, the second engagement groove 33b) or is positioned on the cylindrical surface 34 positioned in the rear of each of the engagement grooves 33a to 33d. Thereafter, during engine operation, as a result of the tension of the chain, a backward pushing force acts on the plunger 3. When the pushing force exceeds the resultant force of the elastic force of the return spring 5 and the pressure of the oil fed in the oil hydraulic damper chamber 9, the plunger 3 and the register ring 7 move backward to reach the position where the resultant force and the pushing force become equal to each other. This backward movement proceeds slowly by the buffering functions of the working oil filling the oil hydraulic damper chamber 9. During the backward movement of the plunger 3, the register ring 7 reduces its diameter while first sliding on the tapered surface 332 serving as a sliding surface from the state shown in FIG. 6. When the register ring 7 is engaged with the lock surface 331 of the engagement groove 33b, the register ring 7 moves backward cooperatively with the plunger 3 while being engaged with the lock surface 331. Along with the backward movement of the plunger 3, an excessive working oil in the oil hydraulic damper chamber 9 leaks outside the housing 1 through an extremely small gap between the inner circumferential surface 1a of the housing 1 and the outer circumferential surface of the plunger 3.

On the other hand, once the chain is loosened, the plunger 3 moves forward by the pushing force corresponding to the resulting force of the return spring 5 and the pressure of the fed oil. Along with the forward movement of the plunger 3, the register ring 7 moves forward cooperatively with the plunger 3. After the ring portion 71 is abutted against the second stopper 22, the register ring 7 increases its diameter while sliding on the tapered surface 332. In the case where the chain is loosened with elapse of time and the plunger 3 further moves forward, the ring portion 71 of the register ring 7 passes over the cylindrical surface 34 so as to be fitted into the engagement groove (in FIG. 6, the third engagement groove 33c) in the rear of the cylindrical surface 34. From then on, a similar operation to that in the case where the ring portion 7 is fitted into the second engagement groove 33bis performed.

Figure 7:
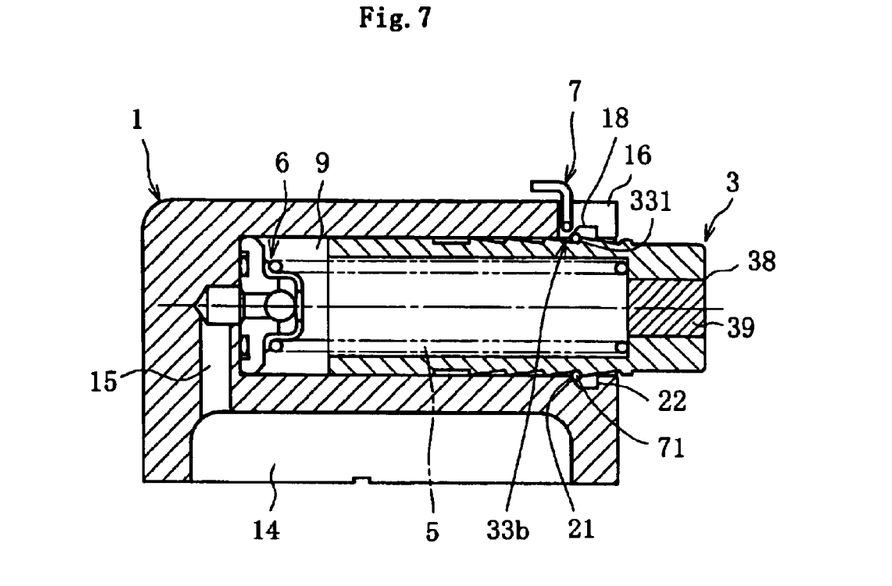
FIG. 7 is a sectional view showing the chain tensioner at the time of return movement regulation.

When the engine is stopped, the plunger 3 is sometimes significantly pushed into the cylindrical portion 11, depending on the relation with a position where a cam is stopped. For example, when the engine is stopped while a change lever is shifted to operate a forward gear on the uphill or the change lever is shifted to operate a back gear on the downhill, the chain is sometimes tensed. In this case, the plunger 3 is significantly pushed into the cylindrical portion 11. Even in this case, since the outer diameter of the ring portion 71 of the register ring 7 is larger than the inner diameter of the first stopper 21 as shown in FIG. 7, the register ring 7 (the ring portion 71) engaged with the lock surface 331 of the engagement groove (for example, the second engagement groove 33b) is subsequently engaged with the first stopper 21. As a result, further backward movement of the plunger 3 is regulated (return movement regulation). In this case, the chain is loosened only by the amount corresponding to the amount of backward movement of the plunger 3. Therefore, even if the engine is restarted, the chain is not significantly loosened. Accordingly, the problems such as the chain coming off a sprocket, the chain skipping or the generation of abnormal sounds can be avoided.

Figure 8:
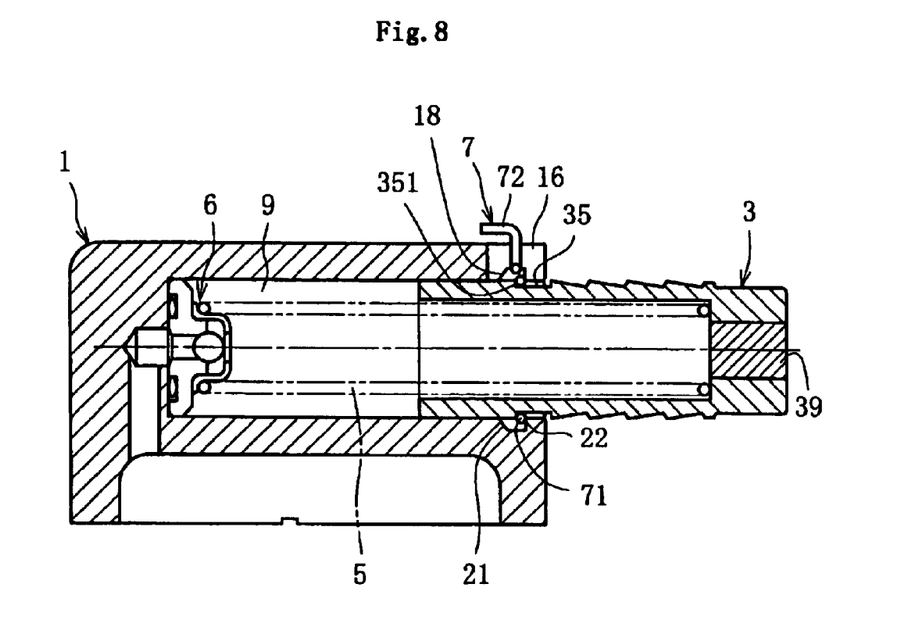
FIG. 8 is a sectional view showing the chain tensioner at the time of disassembly regulation.

When the chain is detached for maintenance around the engine, the elastic force of the return spring 5 is likely to push out the plunger 3. Even in such a case, however, the ring portion 71 of the register ring 7 is fitted into the safety groove 35 as shown in FIG. 8 so that the ring portion 71 engaged with the safety wall 351 is subsequently engaged with the second stopper 22 to restrict the plunger 3 from being pushed out therefrom (disassembly regulation). In this manner, it is ensured that the components such as the plunger 3 and the return spring 5 can be prevented from coming off the housing 1. Even in the case where the plunger 3 is to be removed from the housing 1, the operational portions 72 of the register ring 7 are picked together to increase the diameter of the ring portion 71 so as to cancel the engagement between the ring portion 71 and the safety wall 351. As a result, the above-described removal of the plunger 3 can be easily realized.

As described above, the register ring 7 follows the forward/backward movement of the plunger 3 to move forward/backward. However, when the operational portions 72 of the backwardly moving register ring 7 collide against a wall surface 16a on the bottom of the notch 16 (see FIG. 3), there is a possibility that the register ring 7 might be deformed by this shock. Therefore, a measure to prevent the operational portions 72 of the backwardly moving register ring 7 from contacting the wall surface 16a is desired. Such a measure can be realized by, for example, setting a length D of the notch 16 in the axial direction to be larger than a distance X (a distance from the open end of the housing 1 to the rear end of the register ring 7 in the notch 16 at the time when the lock surface 331 of the engagement groove is engaged with the first stopper 21 through the register ring 7) (D>X), as shown in FIG. 3.

As described above, according to the chain tensioner of the present invention, the initial set state, the return movement regulation and the disassembly regulation can be realized only by using the register ring 7. Accordingly, as compared with the case where these functions are realized with a plurality of ring members or clips, the number of components and the fabrication cost can be significantly reduced. Furthermore, the structure of the grooves on the plunger 3 is simplified. In addition, each of the grooves is formed on the outer circumferential surface of the plunger 3 which is easy to process. Therefore, the processing cost can be further held down. Moreover, since the plunger 3 can be removed from the housing 1 with a simple operation, maintenance can be easily realized.

The register ring 7 is used under a high-temperature environment for a long period of time. Moreover, it should be ensured that its diameter is reduced and increased as required. Therefore, the design of the register ring 7 is required to be deliberately examined so that its operability is stably ensured even under such a harsh environment for a long period of time and the requirements of cost are satisfied as well.

As a result of examinations of the inventors of the present invention, the following characteristics are found to be the most important as the characteristics of the register ring 7:

I) It is ensured that the amount of backward movement of the plunger 3 is kept to a predetermined amount or less at engine stop;

II) The projection ability of the plunger is not affected by a sliding resistance generated when the register ring has its increased diameter; and III) A dimensional change, which may damage the register ring or cause its functional problems, is not caused by the fatigue due to the movement of the register ring 7 for increasing/reducing its diameter during engine operation.

In order to satisfy the above-described characteristic requirements, the inventors of the present invention have continued conducting the examination, focusing attention on an overlapping allowance of the register ring 7 with respect to the engagement grooves 33a to 33d, a bending stress generated at the time when the register ring 7 has an increased diameter, and a tensile strength of the material of the register ring 7. As a result, the inventors of the present invention have found the following preferable ranges thereof.

First, the backward movement regulation of the plunger (the above-mentioned characteristic I) can be realized in the following manner. An overlapping allowance of the register ring 7 with respect to the engagement grooves 33a to 33d of the plunger 3 is set at 30% or more of a wire diameter of the register ring 7. At the same time, a bending stress applied to the register ring 7 when the register ring 7 has the maximum diameter is set at 500 N/mm² or more.

Figure 11:
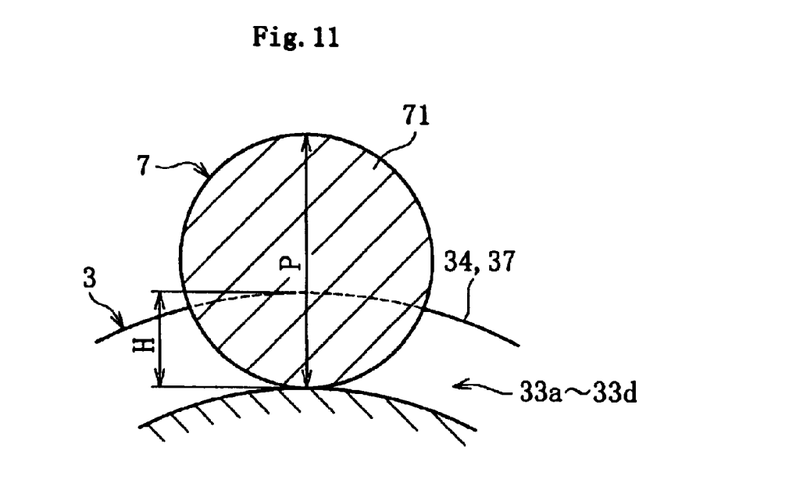
FIG. 11 is a sectional view for illustrating an overlapping allowance of the register ring with respect to engagement grooves.

The term "overlapping allowance" herein indicates the maximum width H of a cross-sectional region of the register ring 7, which is delimited by the profile of the outer circumferential surface of the plunger on the forward side of the engagement grooves 33a to 33d, as shown in FIG. 11. In this embodiment, for the first engagement groove 33a, the outer circumferential surface of the annular projecting portion 37 corresponds to the "outer circumferential surface of the plunger on the forward side." For the second to the fourth engagement grooves 33b to 33d, the cylindrical surface 34 corresponds thereto. In the present invention, a ratio H/P of the maximum width H to the wire diameter P of the register ring 7 (more specifically, the ring portion 71) is set at 30 to 50%. The maximum width H is identical with a depth of the engagement groove in the case where the register ring 7 is fitted into any of the engagement grooves 33a to 33d to reach its deepest portion.

If the overlapping allowance is smaller than 30% of the wire diameter D, the register ring 7 is likely to pass over a forward side of the outer circumferential surface of each of the engagement grooves 33a to 33d when a backward force is applied to the plunger 3. As a result, there is a possibility that the backward movement may be insufficiently regulated. On the other hand, the overlapping allowance exceeds 50% of the wire diameter D, it becomes difficult to cancel the initial set state, resulting in complicated engine assembly. Accordingly, the ratio H/P is required to be set at 50% or less of the wire diameter D.

Moreover, as described above, the register ring 7 increases its diameter while traveling between the engagement grooves, and has the maximum diameter when passing over the outer circumferential surface of the plunger 3 (in this embodiment, the cylindrical surface 34). If the maximum bending stress generated in the register ring 7 when the register ring 7 has the maximum diameter is smaller than 500 N/mm², the backward movement regulating force generated in the register ring 7 becomes insufficient in consideration of dimensional tolerances of the register ring 7, the engagement grooves 33a to 33d and the like. As a result, reliable backward movement regulation is impeded.

Next, the projection ability of the plunger 3 (the above-mentioned characteristic II) can be realized by setting the maximum bending stress generated in the register ring 7 when the register ring 7 has the maximum diameter at 1700 N/mm² or less. With a bending stress exceeding 1700 N/mm² or less, a sliding resistance generated when the plunger 3 outwardly projects is remarkably increased to degrade the followability of the plunger to variation in chain tension.

In view of the above-described facts, it is desirable that the maximum bending stress of the register ring 7 is set within the range of 500 to 1700 N/mm².

Next, for the fatigue resistance of the register ring 7 (the above-described characteristic III), it is desirable that a material of the register ring 7 has a tensile strength of 1000 N/mm² or higher. In the case where the tensile strength is smaller than 1000 N/mm², a sufficient fatigue resistance of the register ring 7 cannot be obtained to lower its durability. Moreover, the strength of the register ring 7 becomes unstable when the plunger 3 is significantly pushed into the cylinder portion 11 due to a delay in oil feeding at engine start to apply an impact load on the register ring 7. The upper limit of the tensile strength of the material of the register ring 7 is preferably set at 3400 N/mm² or less, desirably, 2400 N/mm² or less in view of the cost, the availability and the like.

The above-mentioned silicon-chromium steel oil-tempered wire for valve spring (SWOSC-V) satisfies all the above-described conditions, i.e., the bending stress (500 to 1700 N/mm²) and the tensile strength (1000 N/mm² or higher).

For the design of the register ring 7, a material of the register ring 7 is required to be selected from the group of materials having the maximum bending stress (the bending stress at the time when the register ring 7 has the maximum diameter) of 70% or less of the tensile strength of the material. Hereinafter, it is confirmed whether this condition is satisfied or not in the case where the oil-tempered wire for valve spring (SWOSC-V) is used as a material of the register ring 7. The following description assumes the case where the register ring 7 having an inner diameter φ of 13 is formed of a wire material having a wire diameter φ of 1.

Figure 9:
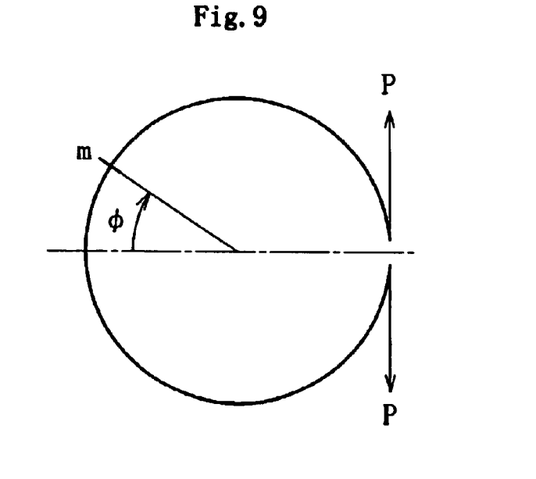
FIG. 9 is a diagram showing an idealized register ring.

First, the register ring 7 is idealized as a C-shaped curved beam shown in FIG. 9. When a force P is applied onto both ends of the beam in a direction perpendicular to a line connecting the end and the center thereof, an internal energy U accumulated in the beam is expressed by the following formula.

$$U = \int_0^s \frac{M^2}{2EI_z} ds \quad (1)$$

According to the Castigliano's principle, a deflection δ is calculated by the following formula.

$$\delta = \frac{\partial U}{\partial P} \quad (2)$$

A bending moment M in a cross section m is calculated by:

$$M = Pr(1 + \cos \phi) \quad (3)$$

By substituting the formula (3) for the formula (1), $$U = \frac{1}{2EI_z} \int_0^\pi P^2 r^3 (1 + \cos\phi)^2 d\phi \quad (4)$$

is obtained. According to the formulae (2) and (4), $$\begin{aligned}
\delta &= \frac{Pr^3}{EI_z} \int_0^\pi (1 + 2\cos\phi + \cos^2\phi) d\phi \\
&= \frac{Pr^3}{EI_z} \left[ \phi + 2\sin\phi + \frac{1}{4}\sin 2\phi + \frac{\phi}{2} \right]_0^\pi \\
&= \frac{Pr^3}{EI_z} \left( \pi + \frac{\pi}{2} \right) \\
&= \left( \frac{3\pi Pr^3}{2EI_z} \right)
\end{aligned} \quad (5)$$

Herein, substituting the values:

$E = 206$ (GPa) $= 2.06 \times 10^5$ (N/mm²)

$r = 7$ (mm)

$$I_Z = \pi d^4/64 (d=1 \text{ (mm)}),$$

for the above formula (5), $$\delta = 0.16P \quad (6)$$

is deduced. It is experimentally elucidated that the ring can be opened with $\delta=1.6$ (mm). Therefore, by substituting this value for the formula (6), an opening force P is obtained as: P=10(N). Accordingly, the register ring 7 can be opened with a moderate opening force P.

The maximum bending stress is generated at a point on the diameter opposite to the ends of the wire material. A value of the maximum bending stress is expressed by:

$$\sigma_{max} = M\text{max}/Z \quad (7)$$

(where $Z=\pi d^3/32$: moment of inertia of the cross section). According to the formula (2), $M_{max}$ is calculated with $\phi=0$. Therefore, $$M\text{max} = 2Pr \quad (8)$$

is obtained.

By substituting the formula (8) for the formula (7), $\sigma_{max}$ is obtained as:

$$\sigma_{max} = 64Pr/\pi d^3$$

By substituting:

P=10(N)

r=7 (mm)

d=1 (mm)

for the above formula, $$\sigma_{max} = 1426 \text{ (N/mm}^2\text{)}$$

is obtained. This obtained value corresponds to 70% of the tensile strength, i.e., about 2100 (N/mm²), of the oil-tempered wire for valve spring (SWOSC-V) having a wire diameter $\phi$ of 1.00 (mm). Consequently, it is confirmed that the maximum bending stress of an actual register ring corresponds to 70% or less of its tensile strength.

Subsequently, the durability of the above-described register ring is actually confirmed through a repeated load test. The test is conducted by:

(1) measuring three points on the inner diameter of the register ring with a profile projector to calculate a diameter;

(2) applying a repeated load to the register ring for 100 times until the register ring reaches its maximum deformation; and (3) repeating the procedure (1) to compare the diameters before and after the test.

Figure 10:
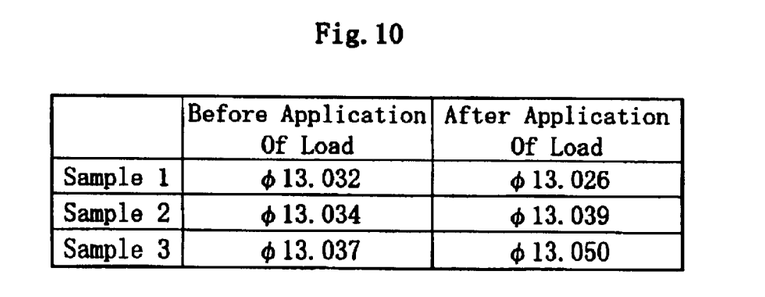
FIG. 10 is a table showing the results of repeated strength tests of the register ring.

The results of measurement are shown in FIG. 10.

As can be seen in FIG. 10, a significant difference equal to or larger than a measurement error is not observed between before and after the repeated load test. In any case, a difference falls within the range of 0.2% of the initial inner diameter. Based on this result, it is confirmed that a permanent strain caused by the repeated use does not remain in the register ring 7 and therefore the register ring 7 has sufficient strength. The operation of the register ring 7 for increasing its diameter is performed on assembly or when the register ring 7 is opened at the initial set, and is therefore performed only several times in a normal use.

Since a sufficient amount of oil is not fed to the oil hydraulic damper chamber 9 at engine start in the chain tensioner according to the present invention, it is not certain if a lubricating state is realized at the register ring 7, on the lock surface 331 of the plunger 3 and the abutting portion of the first stopper 21 in a locked state (a state shown in FIG. 7). Therefore, a load amplitude is applied to the plunger 3 in the locked state to confirm the durability of the lock surface 331.

First, the chain tensioner itself is tested under the following conditions; load amplitude: 100 N to/from 1000 N; frequency shift: 120 Hz; lubrication state: oil application; temperature for evaluation: room temperature; and the number of application of the load amplitude: 1×10⁷. As a result, the amount of wear is 10 $\mu$m or less on either the lock surface 331 or the first stopper 21. Therefore, no particular problem is generated in terms of the durability.

Next, the chain tensioner is attached to an actual engine, and a similar test is conducted with no oil supply (where the number of engine revolutions: 2000 r/min; and endurance time: 200 hours). Even in this case, the amount of wear is similarly 10 $\mu$m or less, and no particular problem is generated.

According to the present invention, since the register ring is formed of a steel material having a tensile strength of 1000 to 3500 N/mm², a fatigue life of the register ring can be prolonged to provide a chain tensioner having high durability.

Furthermore, the overlapping allowance of the register ring with respect to the engagement grooves of the register ring is set at 30 to 50% of a wire diameter of the register ring. At the same time, the maximum bending stress of the register ring having an increased diameter between the engagement grooves is set at 500 to 1700 N/mm². Therefore, the backward movement regulation of the plunger at engine stop can be ensured. Moreover, the followability of the plunger to variation in chain tension can be enhanced. Accordingly, the chain tensioner having good operational stability can be provided.

What is claimed is:

1. A chain tensioner comprising:
    a cylindrical housing with a closed end;
    a plunger slidably fitted into the housing on an inner circumference of the housing;
    a return spring for imparting outward projection ability to the plunger;
    a plurality of engagement grooves formed on an outer circumference of the plunger;
    a first stopper formed on the inner circumference of the housing; and
    a register ring capable of elastically increasing and reducing its diameter, being engaged with the engagement grooves,
    any of the engagement grooves being engaged with the first stopper through the register ring to regulate backward movement of the plunger, wherein
    the register ring is formed of a steel material having a tensile strength of 1000 to 3500 N/mm², and
    wherein a maximum bending stress of the register ring having an increased diameter, when it is positioned between the engagement grooves, is within a range of 500 to 1700 N/mm².

2. The chain tensioner according to claim 1, wherein
    an overlapping allowance of the register ring with respect to the engagement grooves of the plunger is set within a range of 30 to 50% of a wire diameter of the register ring.

3. The chain tensioner according to claim 1 or 2, wherein the register ring is formed of an oil-tempered wire.

4. The chain tensioner according to claim 1, wherein the register ring is selected from a group consisting of materials having a maximum bending stress of 70% or less of the tensile strength of the material.

* * * * *